US 6,715,288 B1

(12) United States Patent
Engels et al.

(10) Patent No.: US 6,715,288 B1
(45) Date of Patent: Apr. 6, 2004

(54) CONTROLLABLE EXHAUST GAS TURBOCHARGER WITH A DOUBLE-FLUTED TURBINE HOUSING

(75) Inventors: Berthold Engels, Weisenheim/Sand (DE); Arno Forster, Worms (DE); Robert Lingenauber, Frankenthal (DE); Jens-Wolf Jaisle, Hejdelberg (DE)

(73) Assignee: BorgWarner, Inc., Auburn Hills, MI (US)

( * ) Notice: Subject to any disclaimer, the term of this patent is extended or adjusted under 35 U.S.C. 154(b) by 0 days.

(21) Appl. No.: 10/069,155

(22) PCT Filed: May 24, 2000

(86) PCT No.: PCT/US00/14295
§ 371 (c)(1),
(2), (4) Date: Aug. 20, 2002

(87) PCT Pub. No.: WO00/73630
PCT Pub. Date: Dec. 7, 2000

(30) Foreign Application Priority Data

May 27, 1999 (DE) ......................... 199 24 228

(51) Int. Cl.$^7$ .................. F01D 17/14; F02B 37/18; F02B 37/22; F02D 23/00
(52) U.S. Cl. .................. 60/602; 415/158; 417/407
(58) Field of Search .................. 60/602; 417/407; 415/160, 164, 158

(56) References Cited

U.S. PATENT DOCUMENTS 4,355,503 A * 10/1982 Grohn .................. 60/602
4,499,731 A    2/1985  Moser
4,776,168 A   10/1988  Woollenweber
4,886,416 A   12/1989  Wunderlich
5,025,629 A    6/1991  Woollenweber
5,758,500 A *  6/1998  Sumser et al. .................. 60/602
5,855,117 A    1/1999  Sumser et al.
5,943,864 A *  8/1999  Sumser et al. .................. 60/602
6,216,459 B1 * 4/2001  Daudel et al. .................. 60/602
6,443,696 B1 * 9/2002  Erdmann et al. .................. 60/602

FOREIGN PATENT DOCUMENTS

DE    4204019 A1    5/1993
DE    4303521 C1    1/1994
DE    4303520 C1    9/1994
GB    1554074      10/1979

* cited by examiner

Primary Examiner—Sheldon J. Richter
(74) Attorney, Agent, or Firm—Pendorf & Cutliff; Greg Dziegielewski

(57) ABSTRACT

An exhaust gas-driven turbocharger (1) exhibits an adjustable radial turbine (2) which powers a compressor (3) by way of a common shaft (4), whereby a turbine housing (5) designed with a multiplicity of scrolls surround the turbine wheel (6) and exhibits at least two afflux ports (7a, 7b) annularly encompassing the turbine wheel (6), whose outlets (8a, 8b) at least partly surround the wheel approach (9) of the turbine wheel (6) and which are at an axial distance from one another. An annular, axially displaceable coupler (15) is provided for opening and closing the outlet (8a, 8b) of at least one afflux port (7a, 7b), so that the boost pressure of the turbine can be influenced thereby.

11 Claims, 3 Drawing Sheets

CONTROLLABLE EXHAUST GAS TURBOCHARGER WITH A DOUBLE-FLUTED TURBINE HOUSING

Figure 1:
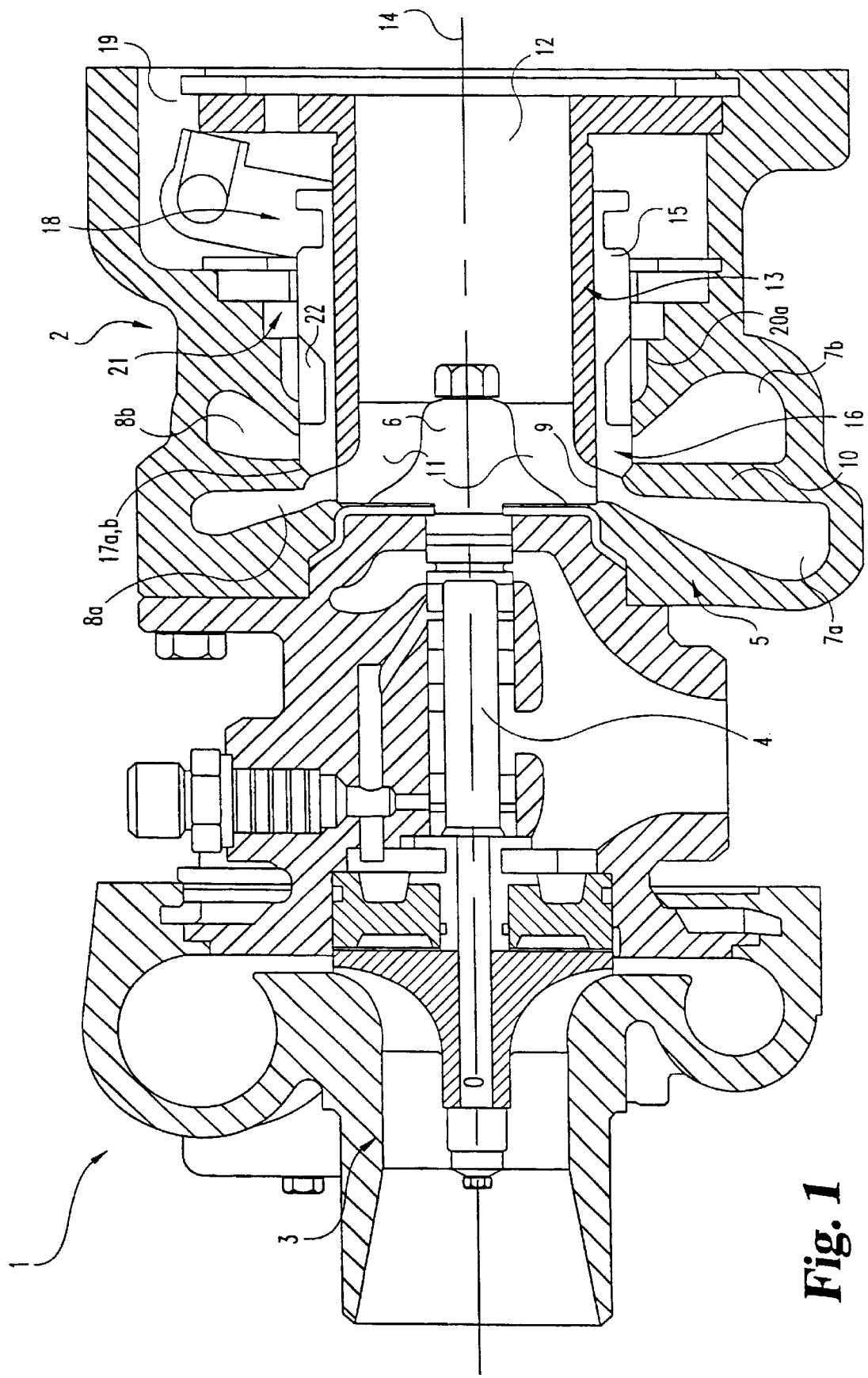

The present invention relates to an exhaust gas-driven turbo-charger as claimed in claim 1. Such an exhaust gas-driven turbo-charger is known from the publication 'Kraftfahrtechnisches Taschenbuch/Bosch' (Pocket book on motor vehicle technology), 21st edition, 1991, page 420 ff.

In exhaust gas-driven turbo-chargers for passenger car engines it is necessary to provide a control of the exhaust gas-driven turbo-charger in order to achieve a near constant boost pressure in the widest possible speed range as a result of the large speed range in passenger car engines. According to the prior art, a control on the exhaust gas side is known in which a portion of the exhaust gas from the engine is guided past the turbine (bypass). The control member required for this purpose can be arranged as a valve or flap. The required control pressure is tapped on the pressure side in the exhaust gas-driven turbo-charger, such that the system of the exhaust gas-driven turbo-charger with the boost pressure control member represents an independent unit.

An energetically more favourable control allows the variable turbine geometry, with which the back pressure behavior of the turbine is charged continuously and thus the entire exhaust gas energy can be used.

From the known embodiments, adjustable guide blades have become generally accepted due to their considerable control range with simultaneously favourable efficiency levels. As a result of the rotary movement of an adjusting ring it is possible to perform an adjustment of the blade angle in a very simple manner. The blades are set to the desired angle either by way of twist cams or directly by way of adjusting levers attached to the blades. Triggering occurs pneumatically by way of an adjusting dashpot with overpressure or underpressure. A microelectronic control can appropriately utilise the advantages of variable turbine geometry by optimal adaptation of the boost pressure over the entire motor diagram.

A variable turbine geometry (VTG), however, constitutes a considerable cost factor, so that in small engines with a smaller piston capacity turbo-chargers with VTG were unable to be generally established.

On the basis of the aforementioned, it is the object of the present invention to provide an exhaust gas-driven turbo-charger of the abovementioned type, which can be used at low cost for smaller engines with a controllable boost pressure.

This object is achieved according to the present invention by the features of claim 1.

The advantage of the invention is that in contrast to exhaust gas-driven turbo-chargers with variable turbine geometry no complex adjusting mechanisms are provided which control the direction and the speed of the exhaust gas flow prior to wheel approach, but that instead the adjustment of the turbine throughput is performed by way of a multi-fluted turbine housing, whereby a second afflux port can be switched on successively by means of the coupler. Impacting of the turbine with exhaust gas can accordingly be influenced by means of a simple, annular coupler directly through opening and closing of an afflux port.

A further advantage is that compared to exhaust gas-driven turbo-charger having variable turbine geometry, in which the highest efficiency is achieved only with approximately 50% of the maximum exhaust gas current, in the case of the exhaust gas-driven turbo-charger according to the present invention the highest efficiency occurs with minimal mass flow, that is, with minimal engine speed. This leads to improvement in the engine torque in the lower rpm range, which is particularly desirable in small-volume engines. This effect results in particular from the multi-fluted, preferably double-fluted, design of the exhaust gas-driven turbo-charger, such that when the coupler is closed the single-fluted impinging for low rpm ranges can be optimized and opened successively only with increasing engine speed of the coupler.

In a further embodiment the bypass port is opened beyond the open position with actuation of the coupler so that the boost pressure can be restricted. It is to be noted here that adjustment of the boost pressure ratio is enabled both by a rise in throughput by opening of another flute and by a drop in the mass current by opening the bypass, by means of only one servo component, the coupler.

Further advantageous embodiments of the invention will emerge from sub-claims 2 to 20.

Figure 2C:
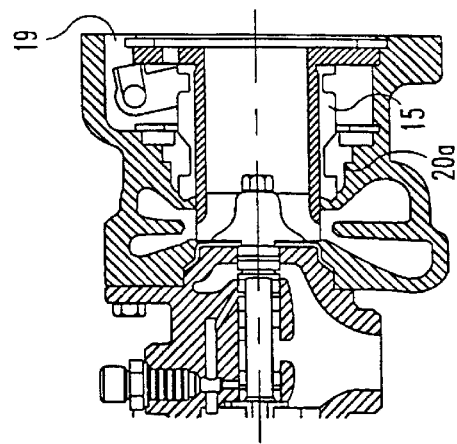
Figure 2B:
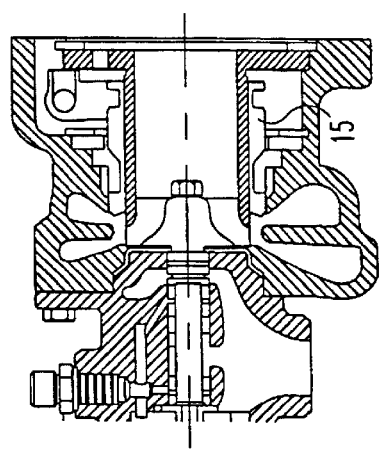
Figure 2A:
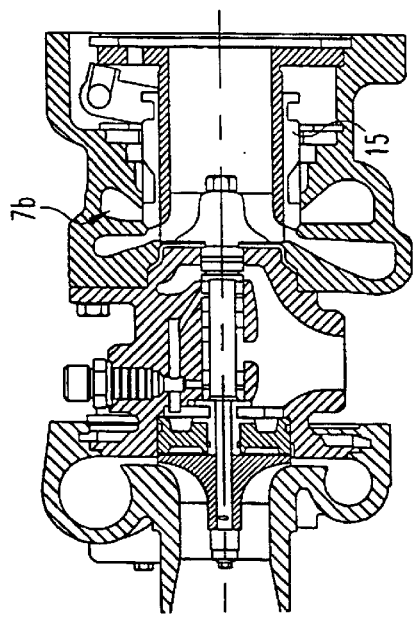
Figure 3A:
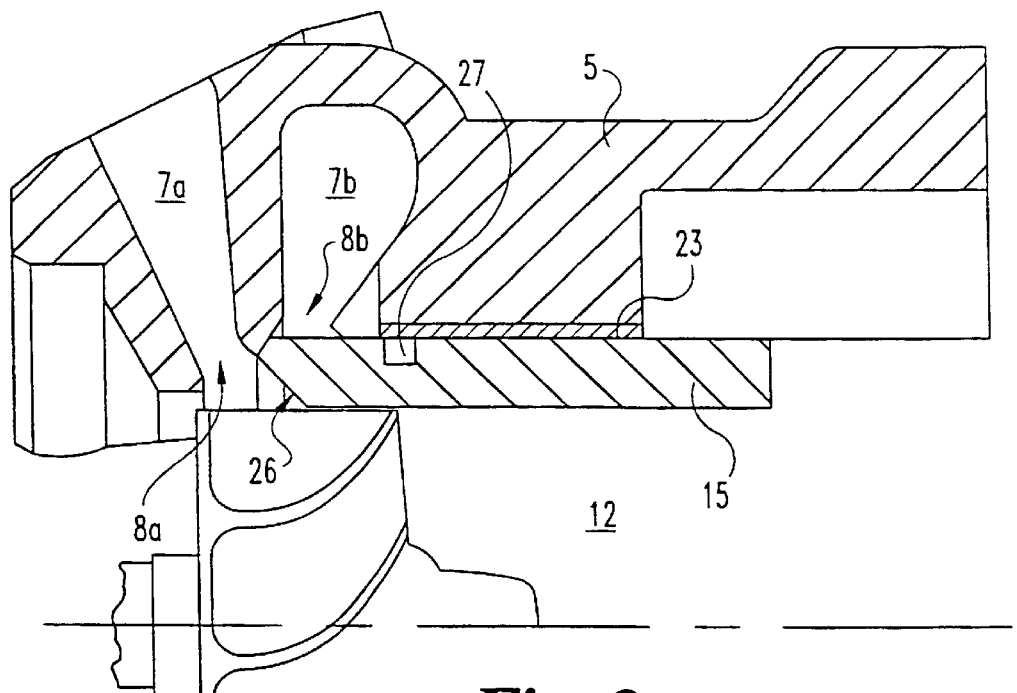
Figure 3B:
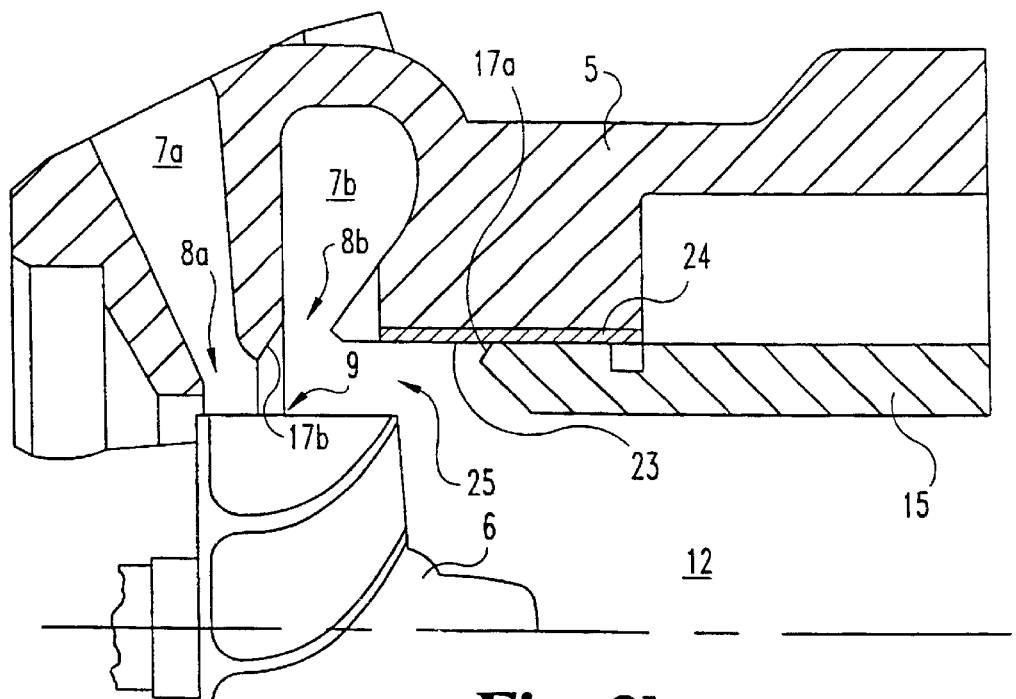

Preferred embodiments of the invention will now be explained hereinbelow with reference to the accompanying diagrams, in which:

FIG. 1 is a longitudinal cross-section of an exhaust gas-driven turbo-charger with contour sleeve and coupler in the closed position, FIG. 2a is a scaled-down illustration of the exhaust gas-driven turbo-charger according to claim 1, FIG. 2b shows the exhaust gas-driven turbo-charger according to FIG. 2a with coupler in the open position, FIG. 2c shows the exhaust gas-driven turbo-charger according to FIG. 2a with coupler in the bypass position, FIG. 3a is a cutout longitudinal section of an exhaust gas-driven turbo-charger with sleeveless coupler control in the closed position, and FIG. 3b shows the exhaust gas-driven turbo-charger according to FIG. 3a with coupler in the bypass position, FIG. 1 illustrates a exhaust gas-driven turbo-charger having a turbine 2 and a compressor 3 powered by turbine 2, both of which are designed in a radial structure. Turbine 2 and compressor 3 are mounted on a common shaft 4.

Turbine 2 utilises the energy contained in the exhaust gas to drive compressor 3 which sucks in fresh air and pushes pre-compressed air into the cylinder of the diesel engine, not illustrated here. In terms of fluid technics, exhaust gas-driven turbo-charger 1 is coupled to the engine only by the air and exhaust gas mass current. Its engine speed is dependent not on the engine speed, rather on the power-weight ratio between turbine 2 and compressor 3.

A double-fluted turbine housing 5 surrounds turbine wheel 6. Integral components of turbine housing 5 are both afflux ports 7a and 7b arranged axially at a distance from one another and whose outlets 8a and 8b concentrically surround wheel approach 9 inside turbine wheel 6 almost over its entire circumference. Both afflux ports 7a and 7b are separated from one another by a radially extending partition 10 of turbine housing 5. The current of exhaust gas exiting from outlets 8a and 8b impacts wheel approach 9, which is formed by the radially outer ends of blades 11 of turbine wheel 6, whereby its blank lends a cylindrical outer contour to the wheel approach. Blades 11 exhibit a curved blank, such that the exhaust gas leaves turbine wheel 6 on a diameter lying radially further inwards. The exhaust gas flow then enters downstream exhaust gas port 12 of radial turbine 2 which is formed by a tubular contour sleeve 13, arranged coaxially to axis 14 of exhaust gas-driven turbo-charger 1. The downstream end of contour sleeve 13 presents a curved blank, such that the contour sleeve conforms to the curved section of blades 11. The external diameter of the cylindrical outer circumference of contour sleeve 13 approximately the same diameter as the diameter of wheel approach 9, such that contour sleeve 13 lies flush with wheel approach 9.

For opening and closing downstream afflux port 7b or its outlet 8b the radial turbine has an annular, axially displaceable coupler 15 which is illustrated in its closed position in FIG. 1 and FIG. 2a. Coupler 15, disposed coaxially to axis 14, encloses contour sleeve 13 concentrically and slides on its cylindrical external profile in its adjustment position in an axial direction. For this purpose coupler 15 is coupled by its downstream end to a drive 16 controlled according to boost pressure. For sealing off downstream afflux port 7b, coupler 15 has on its end on the afflux side a closure head 16 having a conical sealing surface 17a, which in turn cooperates with a conically formed sealing surface 17b of partition 10. In its closed position closure head 16 completely covers over outlet 8b, effectively preventing the escape of exhaust gas from afflux port 7b. In addition, closure head 16 exhibits a cylindrical section connecting to sealing surface 17a. Should the gas throughput for maintaining a preset boost pressure ratio now be increased, coupler 15 is displaced in a downstream direction, resulting in release of outlet 8b and clearing the way for the exhaust gas flow to wheel approach 9. This open position is shown in FIG. 2b.

In order to avoid exceeding the highest permissible boost pressure with increasing engine speed, the exhaust gas-driven turbo-charger exhibits a bypass port 19 whose connection to both flutes joining up directly in front of wheel approach 9 is released by means of further downstream displacement of coupler 15. In this bypass position of coupler 15 illustrated in FIG. 2c its closure head 16 frees up a recess 20a on the housing side. For annular seal 21 to be flowed around downstream of recess 20a in the direction of bypass port 19, coupler 15 also presents a circular groove 22 downstream of closure head 16 so that bypass port 19 is finally connected at least with the exhaust gas flow of afflux port 7b by means of groove 22 and recess 20.

FIGS. 3a and 3b illustrate an alternative embodiment of exhaust gas-driven turbo-charger 1 without the design of a contour sleeve. The function of the contour sleeve is replaced here entirely by the tubular design of coupler 15, such that longitudinally displaceable coupler 15 disposed coaxially also to axis 14 forms exhaust gas port 12.

Turbine wheel 6 is designed with a so-called '100% contour', that is, wheel approach 9 extends essentially over the entire axial depth of turbine wheel 6. Wheel approach 9 is disposed at a radial distance opposite outlets 8a and 8b, as well as opposite a cylindrical section—coupler guide 23. Coupler guide 23 exhibits a bushing 24 for axially displaceable guiding of coupler 15 and for sealing. As illustrated in FIG. 3, both the outer and the inner diameter of sleeve-shaped coupler 15 is matched to the diameter of coupler guide 23 and to the outer diameter of wheel approach 9 such that when the coupler is in its closed state closure head 16 of coupler 15 seals off both afflux port 7b or its outlet 8b and tightly seals off gap 25 resulting from the radial clearance of wheel approach 9 from coupler guide 23. In addition to this, the closure head 16 is essentially designed as the closure head in FIG. 1, so that sealing surfaces 17a and 17b cooperate with one another and closure head 16 seals off outlet 8b when the coupler is in the closed position, as is illustrated in FIG. 3a.

In the closed state coupler 15 covers over wheel approach 9 in an axial section. With successive opening of coupler 15 in the downstream direction closure head 16 releases outlet 8b, allowing the flow of downstream afflux port 7b to impact turbine wheel 6. Likewise, the gap between wheel approach 9 and coupler guide 23 remains closed when outlet 8b is fully freed up by covering over of wheel approach 9. Only through further downstream displacement of coupler 15 does the closure head free the gap, so that a portion of the exhaust gas flow-the discharging-is no longer discharged as illustrated in FIG. 1 around coupler 15, rather inside the coupler.

In order to guarantee optimum impacting of wheel approach 9 by downstream afflux port 7a, closure head 16 presents a conically tapering inlet 26, by means of which a dead normal path is avoided. To ensure imperviousness between turbine housing 5 and coupler 15 a piston ring cooperating tightly with coupler guide 23 is provided in the downstream connection on the closure head. Haynes alloy is used as material for this piston ring to guarantee the required elasticity in maximum operating temperatures. For optimum combined effect between piston ring 27 and bushing 24, the bushing is manufactured from the material Brico PMS 2600 which has not only the necessary temperature and corrosion endurance, but also the lubrication capacity. The solid seat of bushing 24 is ensured by means of a press fit. In contrast to the coupler illustrated in FIG. 1, the coupler according to FIGS. 3a and 3b is designed from the material Brico PMS 2600 instead of the casting material Inconell 713C. This effectively dispenses with the costly casting process required for Inconell.

| | Legend |
| --- | --- |
| 1 | exhaust gas-driven turbo-charger |
| 2 | turbine |
| 3 | compressor |
| 4 | shaft |
| 5 | turbine housing |
| 6 | turbine wheel |
| 7a, b | afflux port |
| 8a, b | outlet |
| 9 | wheel approach |
| 10 | partition |
| 11 | blade |
| 12 | exhaust port |
| 13 | contour sleeve |
| 14 | axis |
| 15 | coupler |
| 16 | closure head |
| 17a, b | sealing surface |
| 18 | drive |
| 19 | bypass port |
| 20a, b | recess |
| 21 | annular seal |
| 22 | groove |
| 23 | coupler guide |
| 24 | bushing |
| 25 | gap |
| 26 | inlet |
| 27 | piston ring |

What is claimed is:

1. An exhaust gas-driven turbo-charger having an adjustable radial turbine which powers a compressor by way of a common shaft, in which the turbine housing defines at least two afflux parts annularly encompassing the turbine wheel having outlets at least partly surround the wheel approach of the turbine wheel and being axially offset from each other, the turbo-charger including an annular, axially displaceable coupler for selectively opening and closing the outlet of at least one afflux port, wherein the turbine housing defines a bypass part axially downstream from the afflux ports; and the coupler and the turbine housing cooperate to define a bypass flow path only when the coupler is in a bypass position.

2. The exhaust gas-driven turbo-charger according to claim 1, wherein when the coupler is in said bypass position the outlets are opened by the coupler.

3. An exhaust gas-driven turbo-charger having an adjustable radial turbine which powers a compressor by way of a common shaft, in which the turbine housing defines at least two afflux ports annularly encompassing the turbine wheel having outlets at least partly surround the wheel approach of the turbine wheel and being axially offset from each other, the turbo-charger including an annular, axially displaceable coupler for selectively opening and closing the outlet of at least one afflux port, wherein the two afflux ports are separated by an annular partition having a radially inner end presenting an annular sealing surface; and the coupler having an annular end sealing surface, wherein the sealing surfaces are conical.

4. The exhaust gas-driven turbo-charger according to claim 3, wherein the coupler extends axially over an axial section of the wheel approach when the coupler is closing at least one of the afflux ports.

5. The exhaust gas-driven turbo-charger according to claim 3, wherein the turbine housing defines a cylindrical guide surface downstream of the turbine, wherein the guide surface includes a bushing against which the coupler axially slides.

6. The exhaust gas-driven turbo-charger according to claim 3, wherein said conical sealing surface of the coupler faces the afflux ports.

7. The exhaust gas-driven turbo-charger according to claim 6, wherein said coupler defines a conically tapering inlet facing the wheel approach opposite said annular end sealing surface.

8. An exhaust gas-driven turbo-charger having an adjustable radial turbine which powers a compressor by way of a common shaft, in which the turbine housing defines at least two afflux ports annularly encompassing the turbine wheel having outlets at least partly surround the wheel approach of the turbine wheel and being axially offset from each other, the turbo-charger including an annular, axially displaceable coupler for selectively opening and closing the outlet of at least one afflux port, wherein the two afflux ports are separated by an annular partition having a radially inner end presenting an annular sealing surface; and the coupler having an annular end sealing surface, wherein the sealing surfaces are conical;
  in which the turbine housing defines a cylindrical guide surface downstream of the turbine, wherein the guide surface includes a bushing against which the coupler axially slides, and
  wherein the coupler includes a radial piston ring that bears against said bushing in sealing relation.

9. An exhaust gas-driven turbo-charger having an adjustable radial turbine which powers a compressor by way of a common shaft, in which the turbine housing defines at least two afflux parts annularly encompassing the turbine wheel having outlets at least partly surround the wheel approach of the turbine wheel and being axially offset from each other, the turbo-charger including an annular, axially displaceable coupler for selectively opening and closing the outlet of at least one afflux port, wherein the turbine housing defines a bypass part axially downstream from the afflux ports; and the coupler and the turbine housing cooperate to define a bypass flow path only when the coupler is in a bypass position, wherein the bypass flow path includes a recess defined in the coupler.

10. An exhaust gas-driven turbo-charger having an adjustable radial turbine which powers a compressor by way of a common shaft, in which the turbine housing defines at least two afflux parts annularly encompassing the turbine wheel having outlets at least partly surround the wheel approach of the turbine wheel and being axially offset from each other, the turbo-charger including an annular, axially displaceable coupler for selectively opening and closing the outlet of at least one afflux port, wherein the turbine housing defines a bypass part axially downstream from the afflux ports; and the coupler and the turbine housing cooperate to define a bypass flow path only when the coupler is in a bypass position, wherein the bypass flow path is radially outboard of the coupler.

11. An exhaust gas-driven turbo-charger having an adjustable radial turbine which powers a compressor by way of a common shaft, in which the turbine housing defines at least two afflux parts annularly encompassing the turbine wheel having outlets at least partly surround the wheel approach of the turbine wheel and being axially offset from each other, the turbo-charger including an annular, axially displaceable coupler for selectively opening and closing the outlet of at least one afflux port, wherein the turbine housing defines a bypass part axially downstream from the afflux ports; and the coupler and the turbine housing cooperate to define a bypass flow path only when the coupler is in a bypass position, wherein disposed between the turbine housing and the coupler is a seal which contacts the coupler in the closed position, while a recess formed in the coupler breaks the contact of the seal, with the coupler in the bypass position, and unblocks the connection to the bypass port.

\* \* \* \* \*

UNITED STATES PATENT AND TRADEMARK OFFICE
CERTIFICATE OF CORRECTION

PATENT NO.     : 6,715,288 B1
DATED          : April 6, 2004
INVENTOR(S)    : Berthold Engels et al.

It is certified that error appears in the above-identified patent and that said Letters Patent is hereby corrected as shown below:

Title page,
Item [75], Inventors, should read -- Berthold Engels, Weisenheim/Sand (DE); Arno Foerster, Worms (DE); Robert Lingenauber, Frankenthal (DE); Jens-Wolf Jaisle, Heidelberg (DE) --

Signed and Sealed this

Twenty-ninth Day of June, 2004

JON W. DUDAS
*Acting Director of the United States Patent and Trademark Office*